United States Patent [19]
Lamb et al.

[11] Patent Number: 5,927,044
[45] Date of Patent: Jul. 27, 1999

[54] PANELS WITH SIMULATED SHINGLES AND METHOD OF MANUFACTURE

[75] Inventors: Jerry A. Lamb, deceased, late of Evansville, by Marilyn L. Lamb, co-personal representative; Kenneth Hedges; James R. Rahn, both of Evansville, all of Ind.

[73] Assignee: American Sheet Extrusion Corporation, Evansville, Ind.

[21] Appl. No.: 08/828,892

[22] Filed: Mar. 31, 1997

[51] Int. Cl.⁶ .............................. B29C 51/00; E04D 1/26
[52] U.S. Cl. ..................... 52/745.19; 52/555; 249/160; 249/167; 264/316; 264/318; 264/319; 264/550; 264/551
[58] Field of Search .................. 52/555, 745.19; 264/292, 318, 334, 549–551, 553, 544, 316, 319, 550; 249/66, 67, 122, 160, 167

[56] References Cited

U.S. PATENT DOCUMENTS

| | | |
|---|---|---|
| 3,613,328 | 10/1971 | Morgan, Jr. et al. . |
| 3,737,498 | 6/1973 | Jackson . |
| 3,897,667 | 8/1975 | Turek . |
| 3,899,855 | 8/1975 | Gadsby . |
| 3,927,501 | 12/1975 | Allen et al. . |
| 3,943,677 | 3/1976 | Carothers . |
| 3,977,141 | 8/1976 | Peters . |
| 4,015,374 | 4/1977 | Epstein et al. . |
| 4,015,391 | 4/1977 | Epstein et al. . |
| 4,130,974 | 12/1978 | Chalmers et al. . |
| 4,290,248 | 9/1981 | Kemerer et al. . |
| 4,343,126 | 8/1982 | Hoofe, III . |
| 4,499,702 | 2/1985 | Turner . |
| 4,598,522 | 7/1986 | Hoofe, III . |
| 4,680,911 | 7/1987 | Davis et al. . |
| 4,822,553 | 4/1989 | Marshall . |
| 4,932,184 | 6/1990 | Waller . |
| 5,034,178 | 7/1991 | Kinugasa et al. . |
| 5,072,562 | 12/1991 | Crick et al. . |
| 5,076,037 | 12/1991 | Crick et al. . |
| 5,249,402 | 10/1993 | Crick et al. . |
| 5,455,099 | 10/1995 | Banner . |
| 5,537,792 | 7/1996 | Moliere . |
| 5,636,481 | 6/1997 | De Zen .......................... 52/555 X |

*Primary Examiner*—Christopher Kent
*Attorney, Agent, or Firm*—Woodard, Emhardt, Naughton, Moriarty & McNett

[57] ABSTRACT

A panel configuration and manufacturing technique are disclosed. The panel simulates a number of shingles each having a hollow end portion. Several of these panels may be utilized to provide an exterior building covering. When installed, hollow end portions of adjacent panels overlap to provide a leak resistant, realistic appearing covering. A number of panels may be formed by positioning each of a number of regions of a web of polymeric resin between a mold and a plug. Each of the regions is molded while in a ductile state to form a corresponding one of the multi-shingle panels. An undercut portion is formed in each of the regions during molding to define an end portion of the panel. This formation includes moving the plug relative to the mold. The sheet is cut after molding to separate the panels from the web.

30 Claims, 11 Drawing Sheets

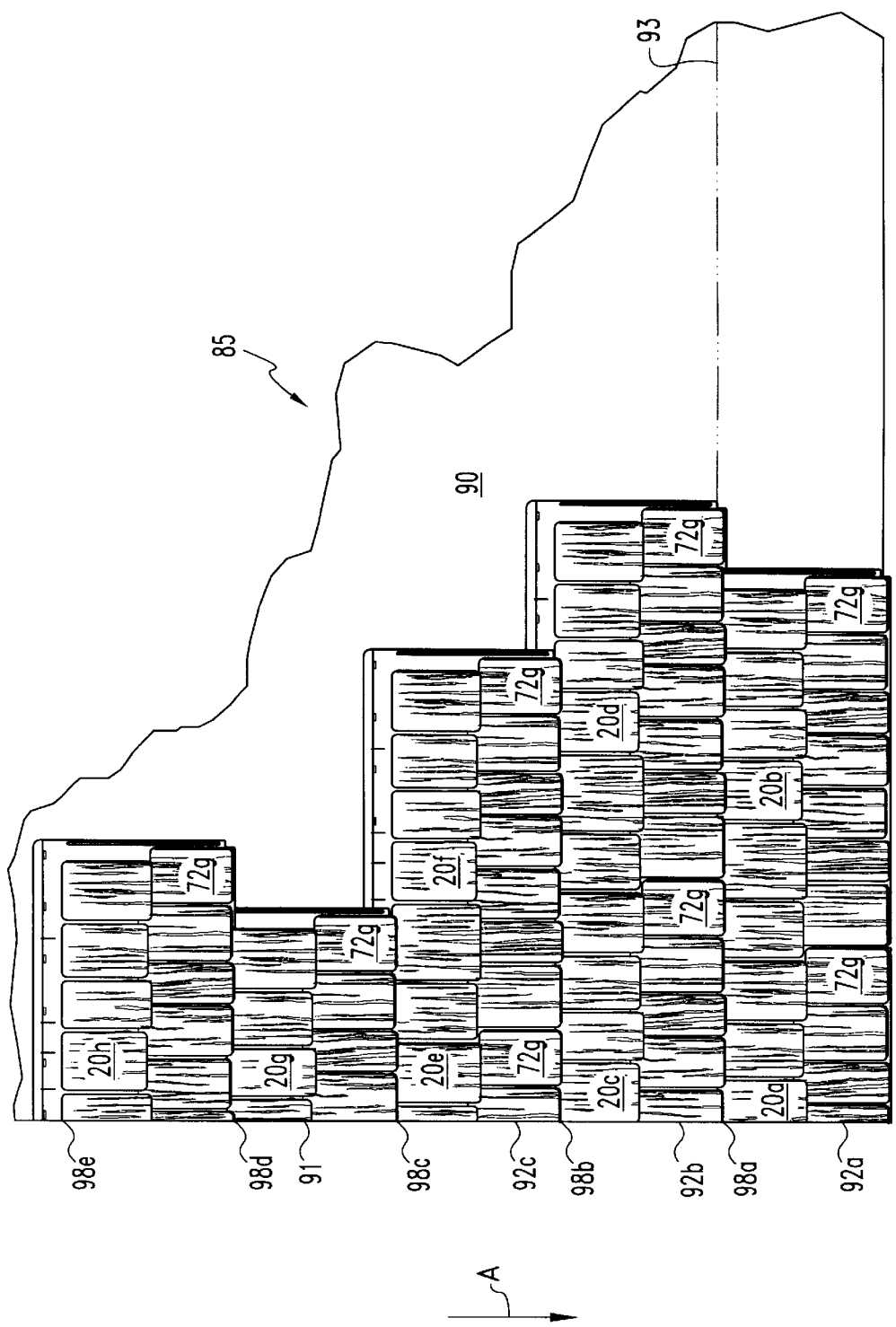

PANELS WITH SIMULATED SHINGLES AND METHOD OF MANUFACTURE

BACKGROUND OF THE INVENTION

The present invention relates to panels for covering the exterior of a building, and more particularly, but not exclusively, relates to panels formed from a polymeric resin that are shaped to simulate a number of shingles.

Panels formed from an organic polymer, such as a thermoplastic or thermoset resin, provide a viable alternative to other roofing and siding materials. Ideally, these panels are shaped to realistically simulate the appearance of traditional, highly desirable coverings, such as shake, tile, or slate shingles to name a few. As discussed in U.S. Pat. Nos. 4,598,522 to Hoofe, III and 4,290,348 to Kemerer et al., various manufacturing techniques have been contemplated to produce panels which simulate multiple shingles.

To provide for cost-effective production, handling, and installation, each panel typically has the same size and shape. Several of these panels are often needed to adequately cover a roof or other exterior surface. The appearance of a covering formed from several panels is usually enhanced by shingle-shaped elements which overlap from one adjacent panel to the next. However, a thermoplastic or thermoset panel with these overlapping elements is often difficult to economically manufacture.

Despite utilization of panels which are each generally sized and shaped the same, a random appearance of a multi-panel covering is also often desired. One approach to improve randomness is to offset adjacent courses of panels. However, a variable offset capability also complicates the formation of a multiple shingle panel from an organic polymeric resin.

These short-comings point to a need for a readily manufacturable panel construction and cost-effective panel manufacturing technique. The present invention addresses this need and provides other benefits and advantages.

SUMMARY OF THE INVENTION

The present invention relates to panels configured to simulate multiple shingles. Various aspects of the invention are novel, non-obvious, and provide various advantages. Although the actual nature of the invention covered herein may only be determined with reference to the claims appended hereto, certain features which are characteristic of the preferred embodiment disclosed herein can be described briefly.

In one feature of the present invention, a number of panels are provided by successively positioning each of a number of regions of a web of polymeric resin between a mold and a plug. The panels are each molded from a corresponding one of the regions with a shape that defines a number of simulated shingles. An undercut portion is formed in each of the regions during molding to define an end portion of at least one of the simulated shingles. This formation includes moving the plug relative to the mold. The sheet is severed after molding to separate the panels from the web. Multiple undercuts may be used to provide simulated shingle elements for overlapping with an adjacent panel.

Another feature of the present invention is a system for producing a number of panels each shaped to define a number of simulated shingles. This system includes a conveyor, a heater, and a molding station. The conveyor moves a web of polymeric resin along a processing path and is adapted to periodically advance a predetermined length of the web to define a corresponding number of web regions. The heating station is positioned along the path to successively heat each of the regions to induce a ductile state. The molding station is positioned along the path downstream from the heating station. The molding station includes a moveable molding member, a molding plug, and a mold platen with a pattern corresponding to the simulated shingles. The molding station successively contacts each of the regions while in the ductile state to correspondingly mold each of the panels. The molding member moves relative to the platen to define a recess and the plug is inserted into the recess during contact of each of the regions with the platen to form an undercut defining an end portion of at least one of the simulated shingles. This system facilitates the cost-effective production of thermoplastic panels with realistic simulated shingle shapes.

In a further feature of the invention, a system for covering a subroof includes a first roofing panel integrally formed from a first thermoplastic sheet defining a first course of simulated shingle shapes projecting from a first base portion. The first course includes a first hollow end portion generally arranged to provide a mating tongue along a lateral axis. The system also includes a second roofing panel configured for mounting to the subroof adjacent the first panel. The second panel is integrally formed from a second thermoplastic sheet defining a second course of simulated shingle shapes projecting from a second base portion. The second course includes a second hollow end portion overhanging a mating recess configured to receive the tongue from the first roofing panel. The first and second panels engage each other by positioning the tongue in the recess to overlap the first and second hollow end portions. The first panel is selectively positionable relative to the second panel along the lateral axis by sliding the tongue within the recess when positioned therein. This selectivity facilitates variation in the lateral offset between adjacent courses of panels, and overlapping of the hollow end portions of the first and second panels to provide a realistic appearance of the multi-panel covering.

Accordingly, it is one object of the present invention to provide panels shaped to simulate a number of shingles.

Another object is to provide a technique to form a panel from a polymeric resin which includes an undercut portion.

Yet another object of the present invention is to provide a technique to form hollow end portions in simulated shingle shapes of a panel.

Still another object is to provide a roofing panel having at least one hollow end portion configured to overlap the hollow end portion of another roofing panel engaged therewith and permit selective positioning of adjacent courses of panels.

Further objects, benefits, forms, aspects, features, and advantages of the present invention will become apparent from the drawings and description contained herein.

BRIEF DESCRIPTION OF THE DRAWINGS

FIG. 7 is a partial view of several panels assembled to provide a covering.

FIG. 9 is a plan view illustrating selected features of the upper molding assembly shown in FIG. 8a.

FIG. 10 is a plan view illustrating selected features of the lower molding assembly shown in FIG. 8a.

DESCRIPTION OF THE PREFERRED EMBODIMENT

Figure 1:
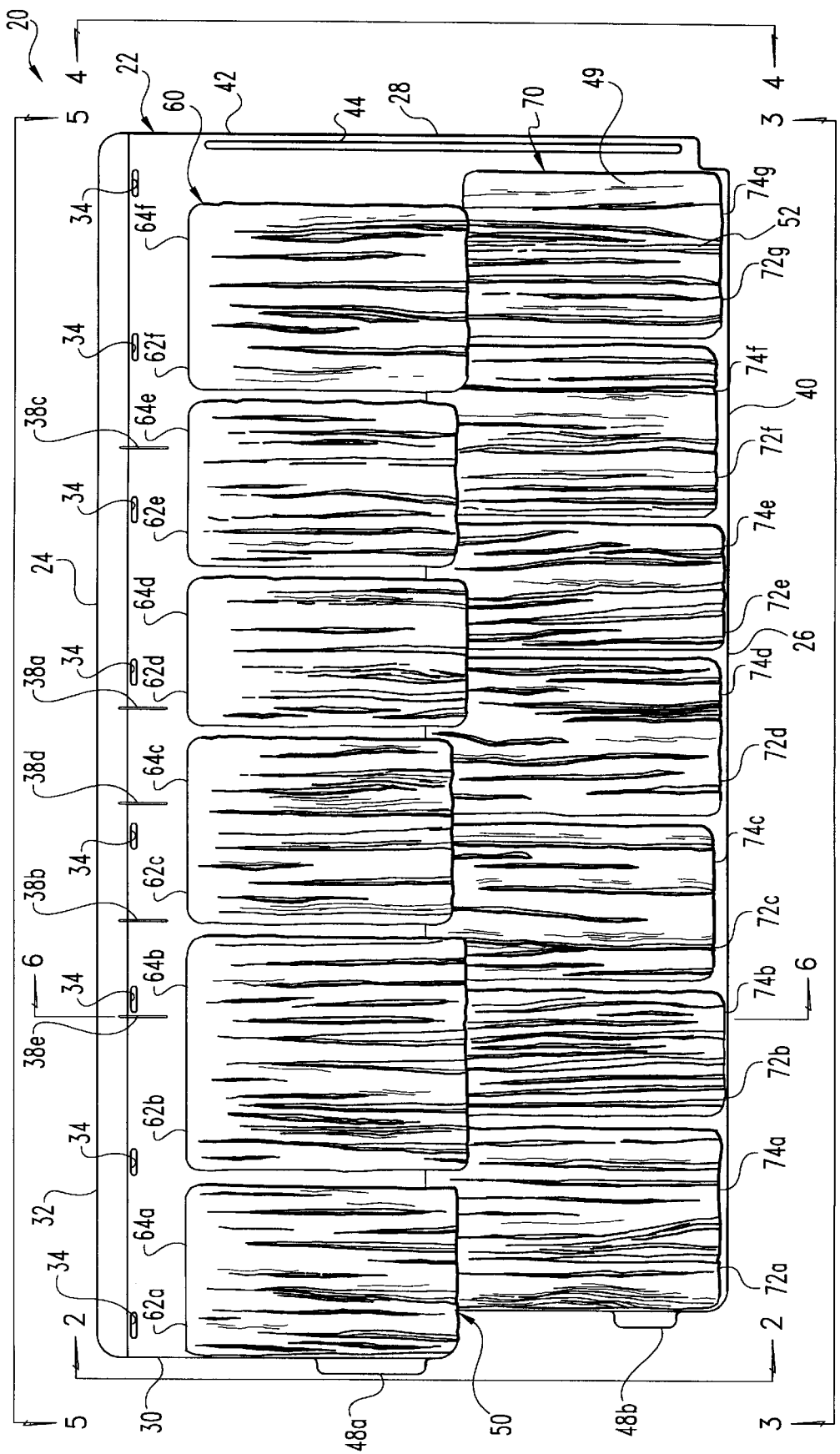
FIG. 1 is a top plan view of a panel of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described device, and any further applications of the principles of the invention as described herein are contemplated as would normally occur to one skilled in the art to which the invention relates.

FIG. 1 is a plan view of a roofing panel 20 of one embodiment of the present invention. Panel 20 has a base portion 22 with top margin 24 opposite bottom margin 26. Base portion 22 further has side margin 28 opposite side margin 30. Top margin 24 is defined by a top mounting strip 32. Top mounting strip 32 defines a number of apertures 34 therethrough. Apertures 34 are configured to receive corresponding fasteners for attachment as a covering. Mounting strip 32 has a number of cutting indicators delineated as raised segments 38a–38e. Segments 38a–38e are spaced apart from each other by different amounts. For a roof covering comprised of several generally horizontal courses of panels 20, a random appearance of the roof covering may be maintained by starting each course with a different portion of panel 20. Five different starting portions of panel 20 are provided by cutting panel 20 along a correspondingly different one of segments 38a–38e. As an example, section lines 6—6 would represent a cut corresponding to segment 38e. The preferred arrangement of multiple panels 20 to provide a roof covering is illustrated in connection with FIG. 7 and described by accompanying text hereinafter.

Figure 2:
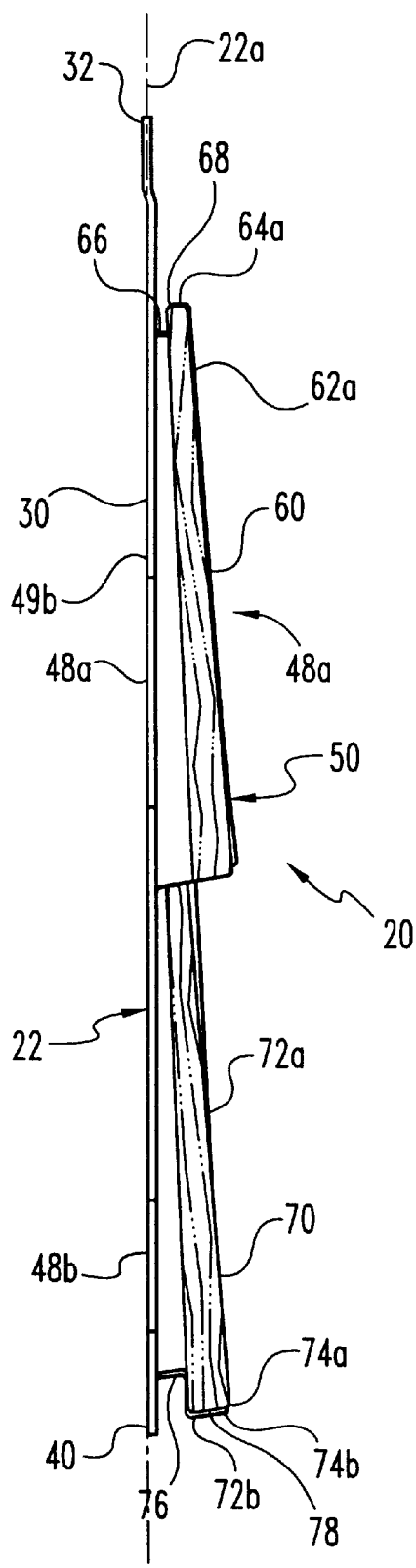
FIG. 2 is an elevational side view of the panel of FIG. 1 taken along view lines 2—2.
Figure 4:
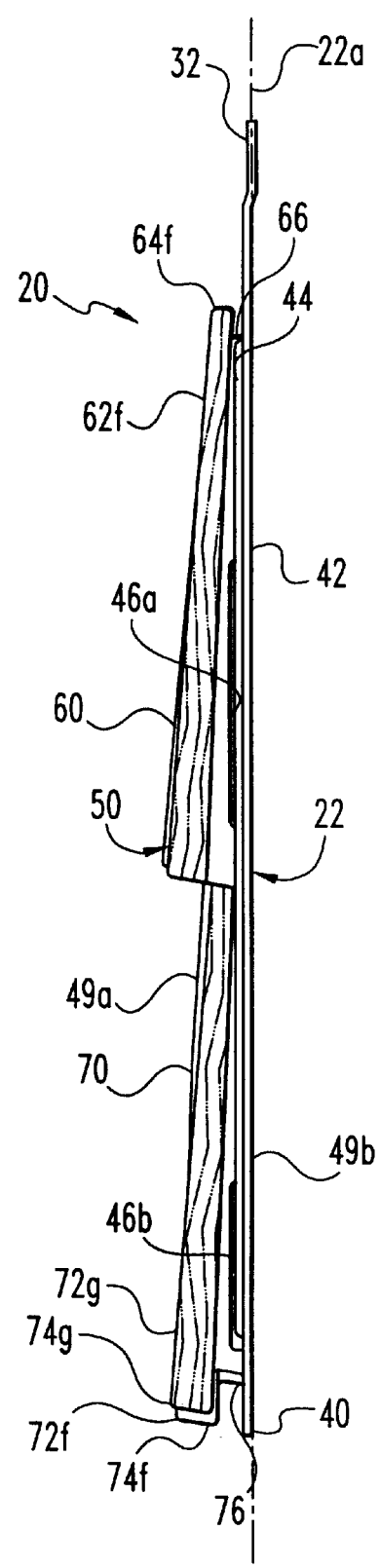
FIG. 4 is an elevational side view of the panel of FIG. 1 taken along view lines 4—4.
Figure 3:
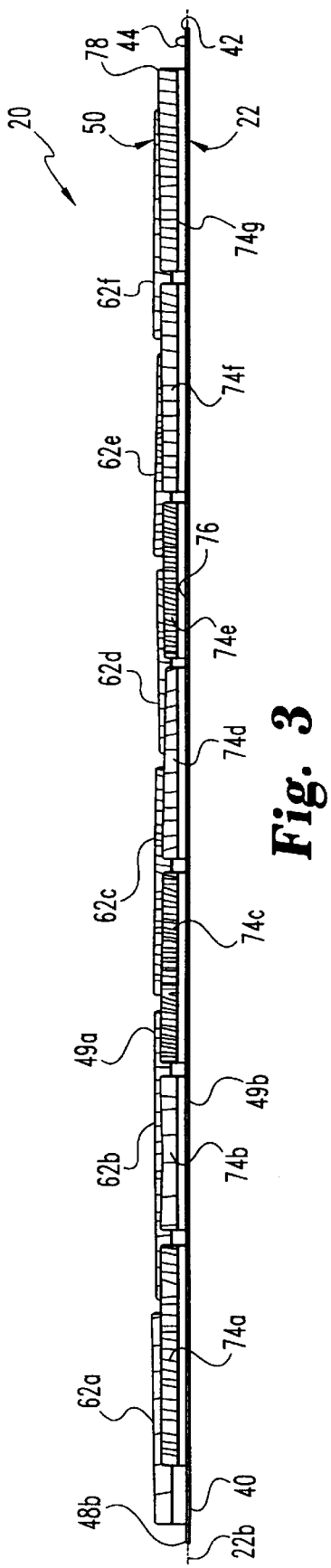
FIG. 3 is an elevational front view of the panel of FIG. 1 taken along view lines 3—3.
Figure 5:
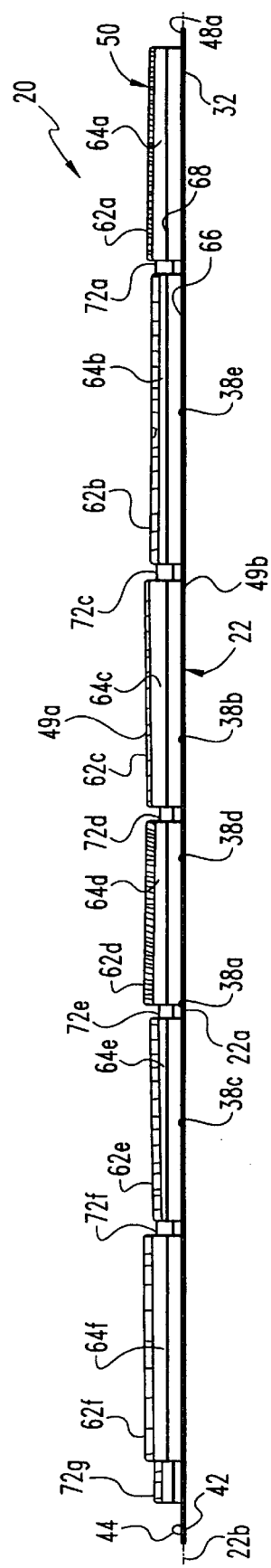
FIG. 5 is a rear elevational view of the panel of FIG. 1 taken along view lines 5—5.

Referring additionally to FIGS. 2–5, bottom strip 40 defines bottom margin 26 and is generally straight and in the same plane as side margins 28 and 30. This plane is generally parallel to the view plane of FIG. 1 and perpendicular to the view plane of FIGS. 2–5. In FIGS. 2 and 4, axis 22a corresponds to this plane, and in FIGS. 3 and 5 axis 22b corresponds to this plane. Axes 22a and 22b are generally perpendicular to each other.

Side strip 42 has an elongate raised tab 44. Margin 30 of panel 20 defines tabs 48a, 48b. Panel 20 further includes recesses 46a, 46b (see FIG. 4). Recesses 46a, 46b are configured to receive tabs 48a, 48b, respectively, to laterally interface like panels.

Top surface 49a of panel 20 is positioned opposite bottom surface 49b. Surface 49a defines a projecting shape 50 simulating a number of shake shingles with a wood grain pattern 52. Panel 20 has an upper shingle course 60 having simulated shingles 62a, 62b, 62c, 62d, 62e, 62f (collectively designated shingles 62). Shingles 62 correspondingly have end portions 64a, 64b, 64c, 64d, 64e, 64f (collectively designated end portions 64). Shingles 62 overlap lower shingle course 70. Course 70 includes shingles 72a, 72b, 72c, 72d, 72e, 72f, 72g (collectively designated shingles 72). Correspondingly, shingles 72 have end portions 74a, 74b, 74c, 74d, 74e, 74f, 74g (collectively designated end portions 74). Shingle courses 60, 70 are offset from one another to impart a realistic appearance to panel 20. Shingles 62, 72 are differently shaped and sized to lend a random appearance to panel 20.

Collectively, end portions 64 define mating flange or tongue 68 which overhangs strip 32 to define groove 66. Collectively, end portions 74 define mating flange or tongue 78 which overhangs strip 40 to define recess 76.

Figure 6:
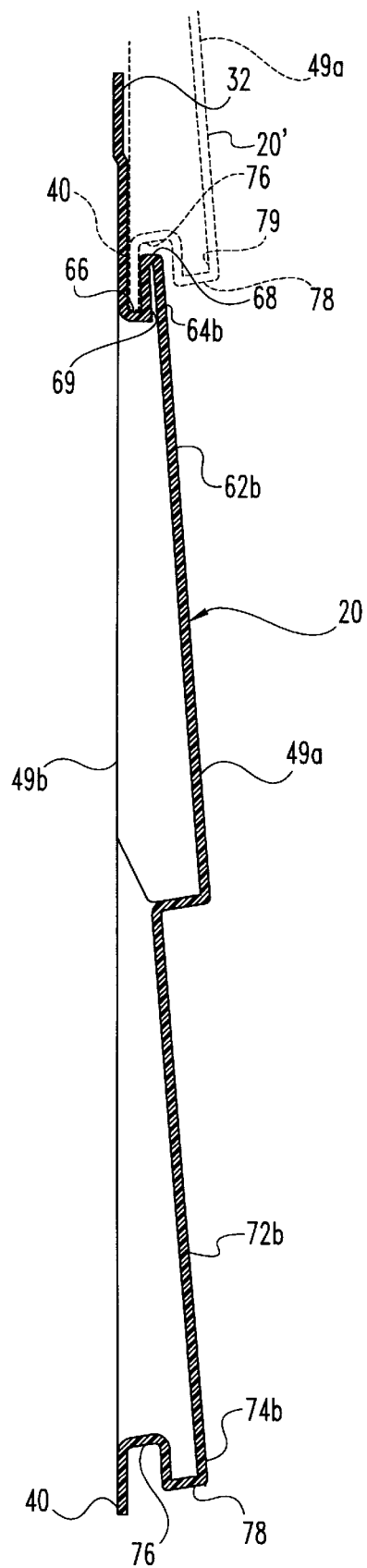
FIG. 6 is a side, cross-sectional view of the panel of FIG. 1 taken along section line 6—6, with a portion of another panel interfacing therewith (shown in phantom).

FIG. 6 is a side cross-sectional view taken along section line 6—6 shown in FIG. 1. As depicted in FIG. 6, end portions 64, 74 are hollow, each corresponding to an undercut 69, 79. FIG. 6 also depicts panel 20' in phantom. Panel 20' is sized and shaped substantially the same as panel 20 with like reference numerals representing like features. Panels 20 and 20' are shown in an interlocking relationship of a type preferred to interface multiple courses of panels. To form this interlocking relationship, bottom strip 40 of panel 20' is positioned over mounting strip 32 and into groove 66 of panel 20. Concurrently, tongue 68 of panel 20 engage, recess 76 defined by panel 20'. Also, tongue 78 overlaps tongue 68 to provide a more realistic simulation of shingle shapes. In this manner, a secure mating relationship may be formed between multiple panels at the top and bottom margins.

FIG. 7 is an illustration of system 85 for covering subroof 90 with panels 20a–20h. Generally, panels 20a–20h are each sized and shaped the same as panel 20 with like numerals representing like features. Panels 20a and 20b are arranged to form first panel course 92a, panels 20c and 20d are arranged to form second panel course 92b, and panels 20e and 20f are arranged to form third panel course 92c. Panels 20a, 20c, 20e, 20g, 20h, have been severed along segments 38a, 38b, 38c, 38d, 38a, respectively, to form differently sized starting panel portions. This operation has defined different starting edges 98a–98e along segments 38a–38e, respectively. Edges 98a–98e are aligned along rake 91 of subroof 90 to offset each course a different amount from one to the next. These offsets enhance the random appearance of the resulting covering in conjunction with the irregular spacing and sizing of shingle shapes within each panel.

As described in connection with FIGS. 1–6, tabs 48a, 48b are correspondingly inserted into recesses 46a, 46b to interlock laterally adjacent panels along lateral axis 93 for each panel course. Axis 93 extends along subroof 90 in a direction generally perpendicular to rake 91. Adjacent courses are interlocked by inserting bottom strip 40 into groove 66 and inserting tongue 68 into recess 76 as discussed in connection with FIG. 6. The tongue and groove interlocking arrangement of bottom strip 40 of a first panel in groove 66 of a second panel and tongue 68 of the second panel in recess 76 of the first panel may be slideably adjusted along lateral axis 93. In this manner, panels of adjacent panel courses may be laterally positioned relative to each other to accommodate the differing amounts of offset attained by severing panels in correspondence with segments 38a–38e (see shingle 72g of each panel 20a–20h to compare relative offset). Also, this feature facilitates adjustment for irregularities in the planarity of the subroof. At the same time the overlapping, hollow, shingle-shaped end portions 64, 74 participating in the interlocking relationship present a realistic, random appearing shake roof appearance.

Preferably, lower courses are secured to subroof 90 with fasteners through apertures 34 before interlocking with an upper course. For example, course 92a is preferably fastened to subroof 90 before panels of course 92b are interlocked therewith. Before fastening to subroof 90, the panels of course 92b may be adjusted along axis 93 as appropriate. Once course 92b is fastened to subroof 90, then course 92c interlocks, and so on. Naturally, additional panels may be utilized to extend courses 92a–92c across the full width of a given planar zone of a roof. Preferably, any overhang beyond the roof rake is trimmed off. Additional panels may be interlocked with panels 20g, 20h to form corresponding panel courses. Given an appropriate number of properly sized panels, multiple course coverage of generally any planar region may be obtained with the present invention.

It is preferred that edge molding (not shown) be utilized at the rakes (such as rake 91) of a roof to which one or more panels of the present invention are applied. This molding receives the panel edges to provide secure installation without leaks. It is also preferred that molding be used with similar functional attributes to cover panels which meet at an apex, hip, or valley of a roof, and that flashing or other suitable materials be used to accommodate vents, flues and other structures that interrupt the planarity of a region of a roof to be covered by the panels. Preferably, panels 20a–20h are dimensioned to provide the largest coverage area that still readily facilitates transport and handling of the panels manually. Subroof 90 is inclined downward in the direction indicated by arrow A. This incline facilitates the shedding of rain in the direction of arrow A for the simulated shingle shape 50 described in connection with FIGS. 1–6 and oriented as shown in FIG. 7.

Preferably, panels of tale present invention are integrally formed from a sheet of thermoplastic material. In one preferred embodiment, panel 20 is formed from a unitary sheet of a thermoplastic composition supplied by General Electric Corporation under the NORYL trademark. In another embodiment, a different organic polymeric resin is used to manufacture panel 20. Moreover, panel 20 may be comprised of more than one part in alternative embodiments. In still other embodiments, panel 20 is formed or assembled from various materials as would occur to one skilled in the art.

Figure 8A:
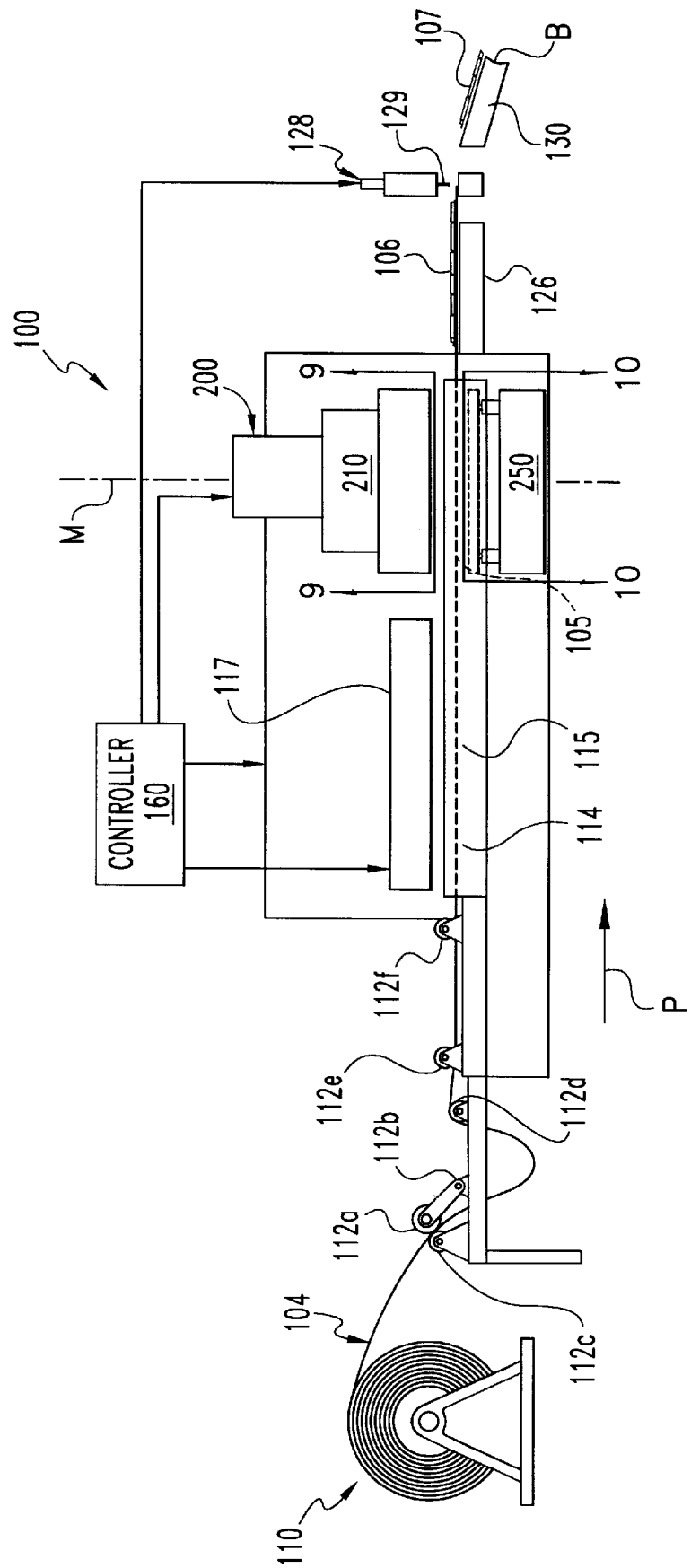
FIGS. 8a and 8b collectively provide a schematic view of a manufacturing line for making thermoplastic panels.
Figure 8B:
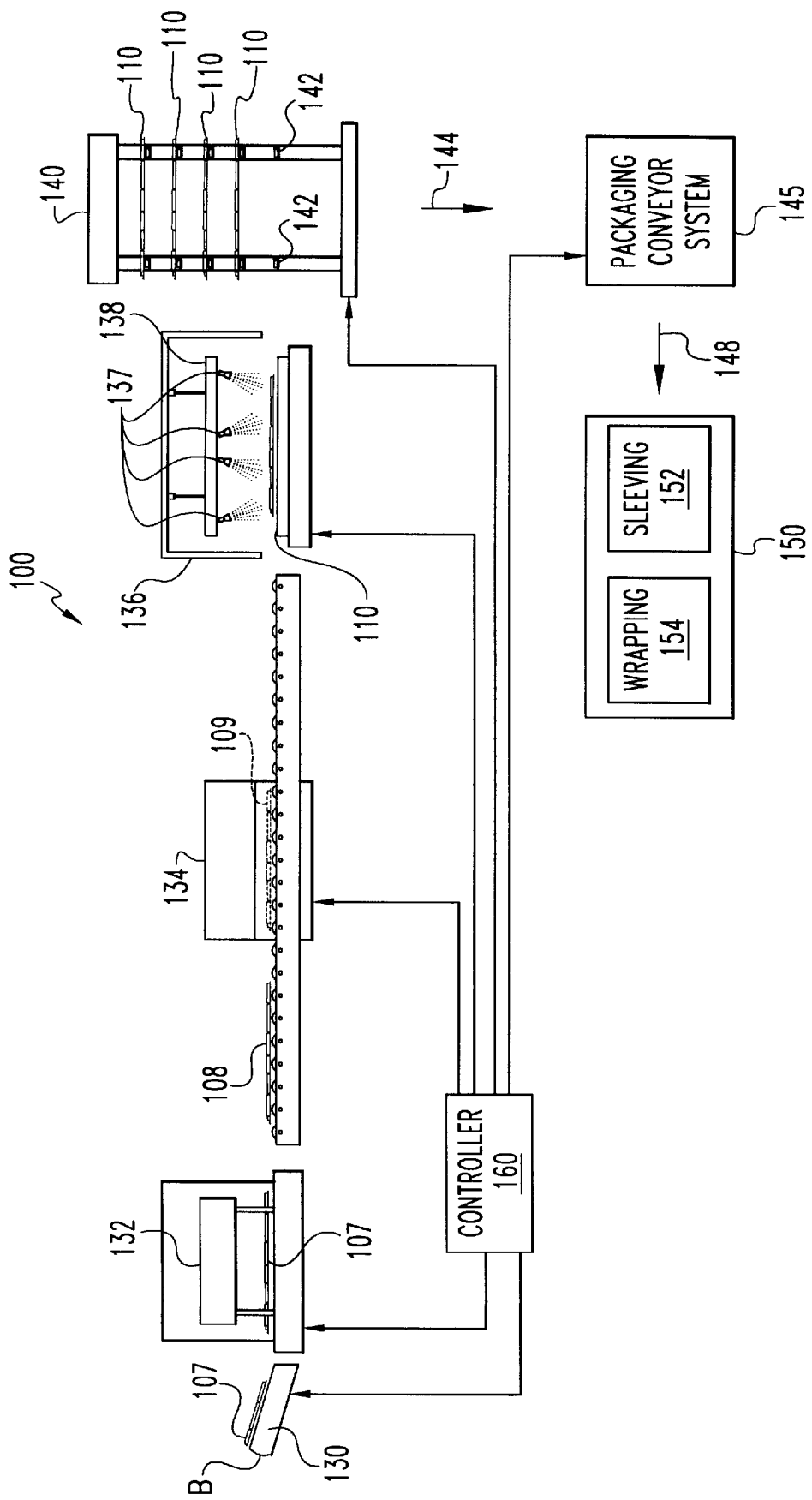

One system for manufacturing roofing panels 20 is depicted in FIGS. 8a and 8b as panel manufacturing line 100. Referring to FIG. 8a, Panels 20 are formed from a sheet of thermoplastic material unwound from reel 110 to form a web designated by reference numeral 104. Wet 104 is threaded about rollers 112a–112f and engages conveyor 114. Rollers 112a–112f are configured to provide appropriate tension on web 104. Conveyor 114 engages the edges of web 104 with rollers (not shown) to controllably advance web 104 along a processing path in the direction indicated by arrow P and expose a region of web 104 to heating station 117. Heating station 117 is configured to heat a region of web 104 until a desired moldable, ductile state is achieved. Preferably, station 117 includes quartz rod heating elements. Ductile region 105 of web 104 emerges from heating station 117 to enter molding station 200.

Molding station 200 includes upper molding assembly 210 and lower molding assembly 250 shown in a retracted position with region 105 positioned therebetween. Station 200 has a controlled molding cycle during which assemblies 210, 250 reciprocally move towards each other along axis M to mold region 105 therebetween; then separate, releasing molded portion 106. Axis M is generally perpendicular to the direction indicated by arrow P.

Controller 160 is operatively coupled to conveyor 114, heating station 117, and station 200. Controller 160 periodically generates an advancement signal. Each advancement signal prompts the movement of successive predetermined lengths of web 104 along arrow P. As a consequence, successive portions of web 104 are exposed to heating station 117 to form successive ductile regions 105. For each ductile region 105 positioned between molding assemblies 210, 250; controller 160 sends a molding signal to molding station 200 to prompt a molding cycle. Controller 160 times the molding cycle to occur between periodic advancements of web 104 by conveyor 114 so that region 105 remains generally stationary relative to arrow P during molding. The edges of region 105 are held between rollers of conveyor 114 in the vicinity of station 200.

After the molding cycle completes, molded portion 106 is pushed away from station 200 to bed 126 with the next periodic advancement by conveyor 114. Molded portion 106 rests on bed 126 adjacent cutting station 128 during the next molding cycle.

Cutting station 128 includes blade 129 depicted in a retracted position. Controller 160 is also operatively coupled to cutting station 128 to control actuation of blade 129. With the next periodic advancement, conveyor 114 moves molded portion 106 from bed 126 past blade 129. Portion 106 passes under retracted blade 129 during this advancement. During the next molding cycle, controller 160 sends a cutting signal to cutting station 128 to extend blade 129 downward to sever molded portion 106 from web 104, forming rough panel 107.

Referring additionally to FIG. 8b, rough panel 107 is moved by inclined conveyor 130 to stamping station 132 which is also regulated by operative coupling to controller 160. Rough panel 107 and conveyor 130 are broken at break line B to illustrate the transition from FIG. 8a to FIG. 8b. Rough panel 107 is positioned beneath a stamping die at station 132 which is actuated to stamp rough panel 107 to form tabs and apertures, and to trim excess material, resulting in a stamped panel 108. Preferably, stamped panel 108 has substantially the same shape as panel 20.

Stamped panel 108 is conveyed to surface preparation station 134. Station 134 subjects the surface of panel 108 to electric corona discharges to remove oxidation and prepare the surface for painting. The resulting treated panel 109 is transported to painting station 136 where spray guns 137 apply one or more coatings of paint to panel 109 to provide a painted panel 110. Guns 137 are mounted on carriage 138 configured to move in two mutually perpendicular directions to assure an even coating of paint. Controller 160 is operatively coupled to painting station 136 to regulate operation thereof. In one preferred embodiment, an undercoat is sprayed on each panel 109 followed by an overcoat of selected coloration.

Painted panel 110 is conveyed from station 136 to vertical conveyor 140. Vertical conveyor 140 includes a number of pairs of arms 142 each configured to support a panel 110. Panels 110 are incrementally moved upward by conveyor 140 in accordance with control signals from controller 160. Preferably, the advancement of panels 110 on conveyor 140 corresponds to the duration of time needed to dry paint applied with station 136.

Panels 110 are transported from conveyor 140 to packaging conveyor system 145 as represented by arrow 144.

Packaging conveyor system 145 is operatively coupled to controller 160 and may include one or more additional conveyors to advance panels 110 to one or more packaging stations. In one embodiment, an overhead horizontal conveyor accepts panels from vertical conveyor 140 and successively transports the panels to a second vertical conveyor. At this second vertical conveyor, the panels descend to another horizontal conveying system.

Conveyor system 145 moves panels 110 to packaging stations 150 as indicated by arrow 148. Packaging stations 150 include sleeving station 152 where a predetermined number of panels 110 are bundled together within a sleeve. After sleeving, the sleeved groups of panels advance to wrapping station 154 where the sleeved panels are wrapped in a packaging material. The wrapped panels are then stored or shipped as required.

The regulated mechanical movement of various components of stations, conveyors, and other elements of manufacturing line 100 may be provided by pneumatic, hydraulic, electromagnetic, or other types of suitable actuators responsive to signals from controller 160. Controller 160 may be an electronic circuit comprised of one or more components. Similarly, controller 160 may be comprised of digital circuitry, analog circuitry, or both. Also, controller 160 may be programmable, an integrated state machine, or a hybrid combination thereof. However, preferably controller 160 is a microprocessor-based controller of a known construction suitably programmed and interfaced to actuator subsystems using techniques known to this skilled in the art.

Similarly, various sensors may be positioned along manufacturing line 100 to detect the presence, location, temperature, or other parameters of web 104, region 105, or any of panels 107, 108, 109, 110 as would occur to one skilled in the art. Such sensors may provide corresponding signals to controller 160 and be of a conventional type.

Figure 9:
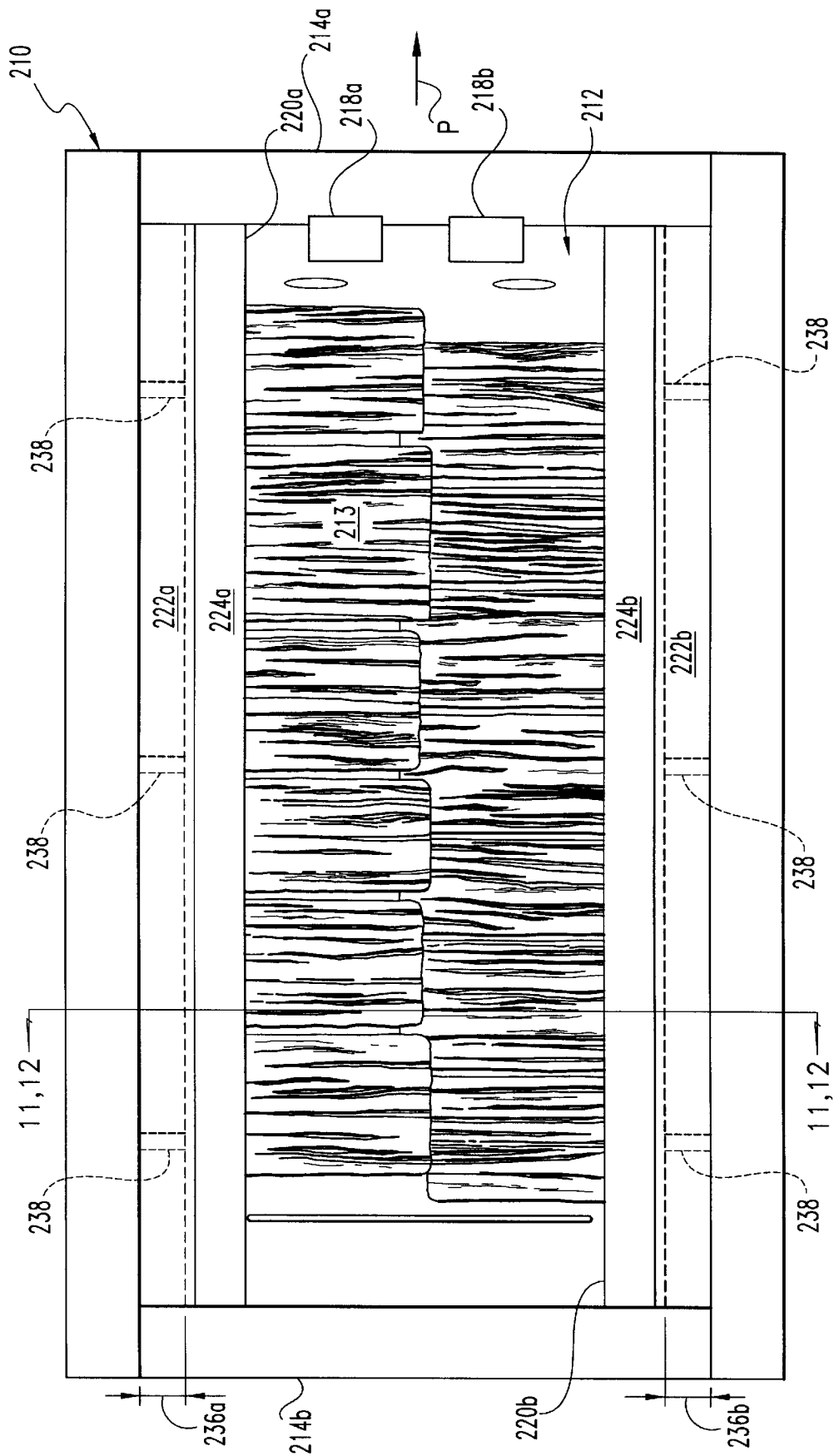

Further details concerning molding station 200 are next described. FIG. 9 is a plan view of molding assembly 210 of station 200. Assembly 210 includes mold or platen 212 located therein. Platen 212 has surface 213 shaped to impart a substantial portion of the simulated shingle shapes of panel 20 to each successive ductile region 105 during the molding cycle. Notably, platen 212 includes a number of differently shaped channels to depict the wood grain pattern 52 of panel 20 and delineate shingle courses 60 and 70 (see FIG. 1). Assembly 210 also defines a number of small apertures (not shown) utilized to draw ductile region 105 against platen 212 by suction. This vacuum forming technique creates a pneumatic pressure differential which assists in urging tile ductile region into various channels and crevices of platen 212. Preferably, platen 212 is cast from a suitable metallic alloy using conventional techniques.

Frame 211 also includes end blocks 214a, 214b which are preferably formed from an appropriate metallic alloy and are positioned on opposite ends of platen 212 along arrow P. Stop blocks 216a, 216b are positioned between end blocks 214a, 214b along arrow P. Collectively blocks 214a, 214b, 216a, 216b provide a frame about platen 212. Assembly 210 includes roll-out plates 218a, 218b pivotally mounted to end block 214a. Plates 218a, 218b are spring-biased to rest in the position shown in FIG. 9. FIG. 9 illustrates the largest dimensions of each plate 218a, 218b; the thickness being substantially smaller (not shown). During the release of molded portion 106 from assembly 210, the force bearing against plates 218a, 218b overcomes the spring-bias to move plates 218a, 218b downward, permitting separation.

Figure 11:
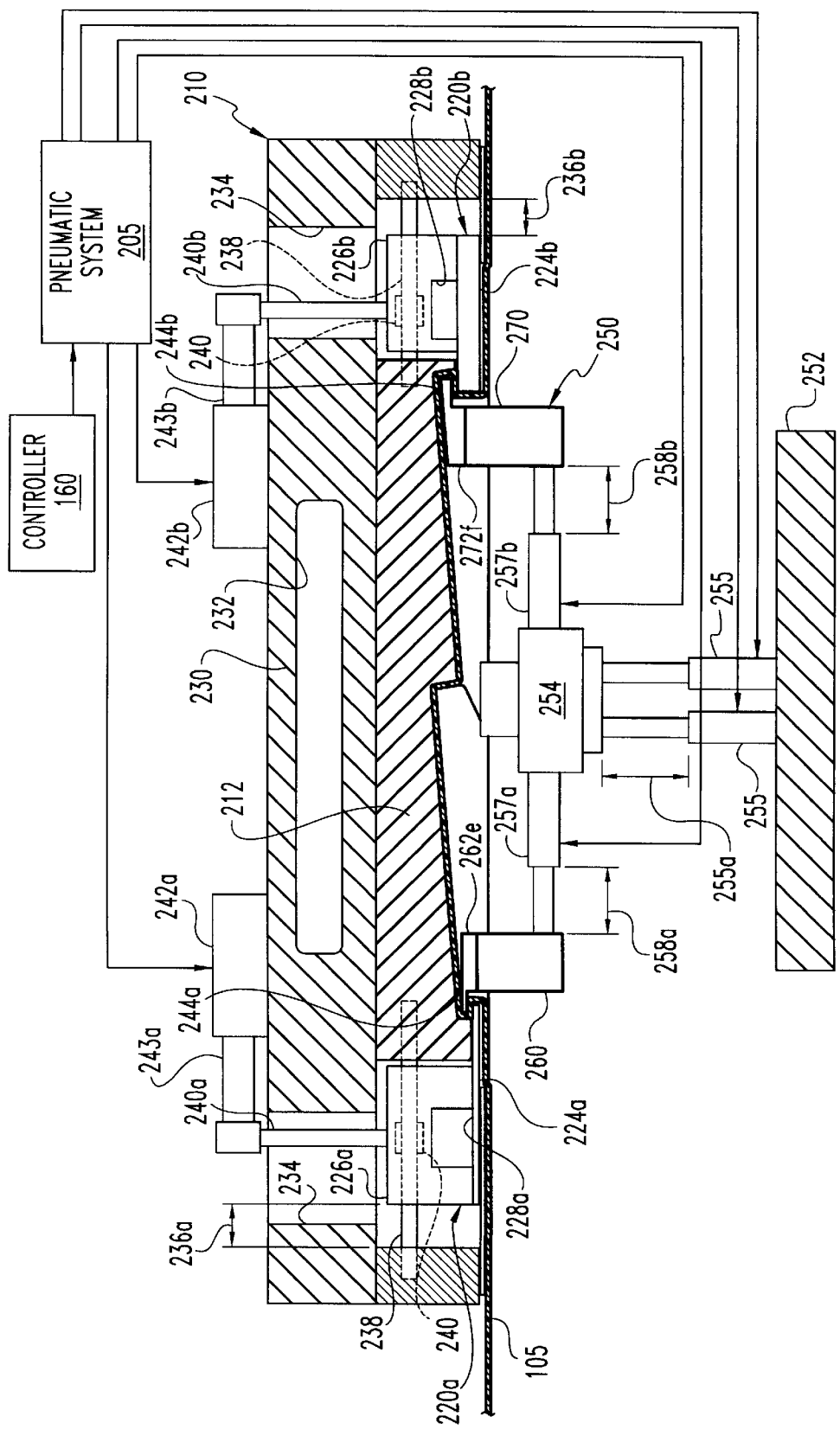
FIG. 11 is a partial, schematic cross-section of the molding station of FIG. 8a shown in an extended configuration.
Figure 12:
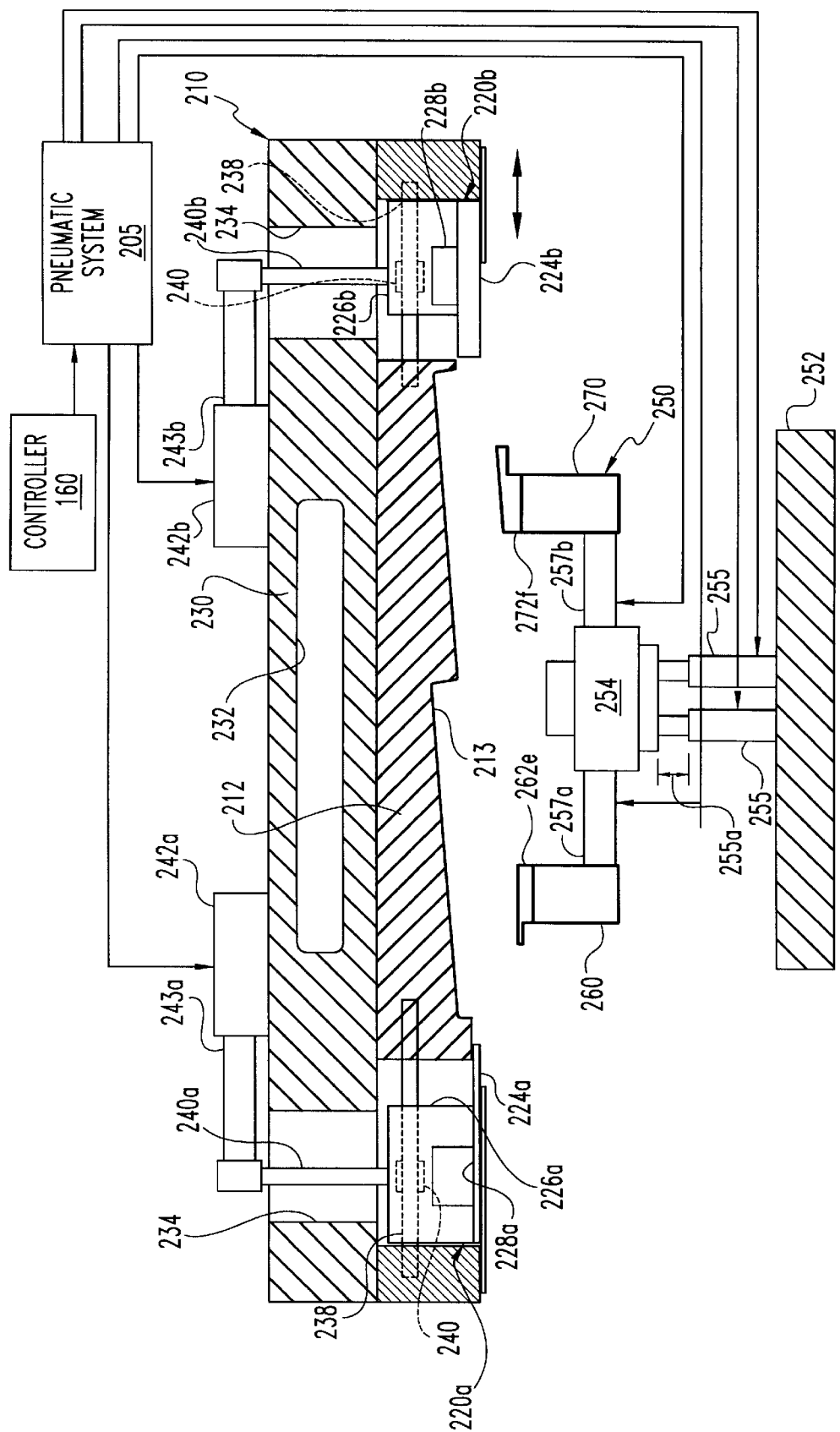
FIG. 12 is a partial, schematic cross-section of the molding station of FIG. 8a shown in a retracted configuration.

Referring additionally to FIGS. 11 and 12, cross-sectional views of assembly 210 corresponding to section line 11—11 of FIG. 9 are illustrated. Positioned between stop blocks 216a, 216b and platen 212, are adjustable molding members 220a, 220b respectively. Members 220a, 220b are partially obscured by corresponding cover plates 222a, 222b, in FIG. 9. Members 220a, 220b have forming plates 224a, 224b in contact with cooling blocks 226a, 226b, respectively. Each block 226a, 226b runs the length of corresponding plate 224a, 224b and defines cooling cavity 228a, 228b for receiving a cooling fluid therethrough. In one embodiment, cavity 228a, 228b has a cooling fluid receiving inlet adjacent end block 214b and a cooling fluid discharge outlet adjacent end block 214a. These inlets and outlets are coupled to a source of chilled water via appropriate conduits (not shown).

In contact with platen 212 and stop blocks 216a, 216b is cooling plate 230. Plate 230 includes a cooling fluid passageway 232 for cooling molding platen 212 and stop blocks 216a, 216b. Preferably, passageway 232 of plate 230 is coupled to the same cooling fluid source as cooling cavities 228a, 228b to controllably cool assembly 210 during the molding cycle.

Each member 220a, 220a is configured to reciprocally move along travel distance 236a, 236b, respectively. This movement is guided by guide pins 238 via bearing 240 (bearings 240 are shown in phantom in FIGS. 11 and 12). In FIG. 9, three guide pins 238 are shown in phantom for each member 220a, 220b. Plate 230 defines drive rod passages 234 therethrough. Drive rods 240a, 240b are rigidly connected to cooling blocks 226a, 226b of members 220a, 220b, respectively. Rods 240a, 240b extend through a corresponding passage 234 of plate 230. Rods 240a, 240b are each coupled to a corresponding pneumatic cylinder 242a, 242b to control position of members 220a, 220b along travel distances 236a, 236b by pushing or pulling on rods 240a, 240b, with cylinder rams 243a, 243b, respectively. In one embodiment, two rods 240a are connected to member 220a, spaced at approximately equal distances from end blocks 214a, 214b, respectively; and two rods 240b are connected to member 220b, spaced at approximately equal distances from end blocks 214a, 214b, respectively. For this embodiment, rods 240a, 240b each extend through one of four appropriately spaced passages 234, and a pair of cylinders 242a, 242b are correspondingly coupled to rods 240a, 240b to position members 220a, 220b.

Preferably, cylinders 242a, 242b are of the double acting variety. Cylinders 242a, 242b are connected to pneumatic subsystem 205 which is regulated by controller 160 previously described in connection with FIGS. 8a and 8b.

Figure 10:
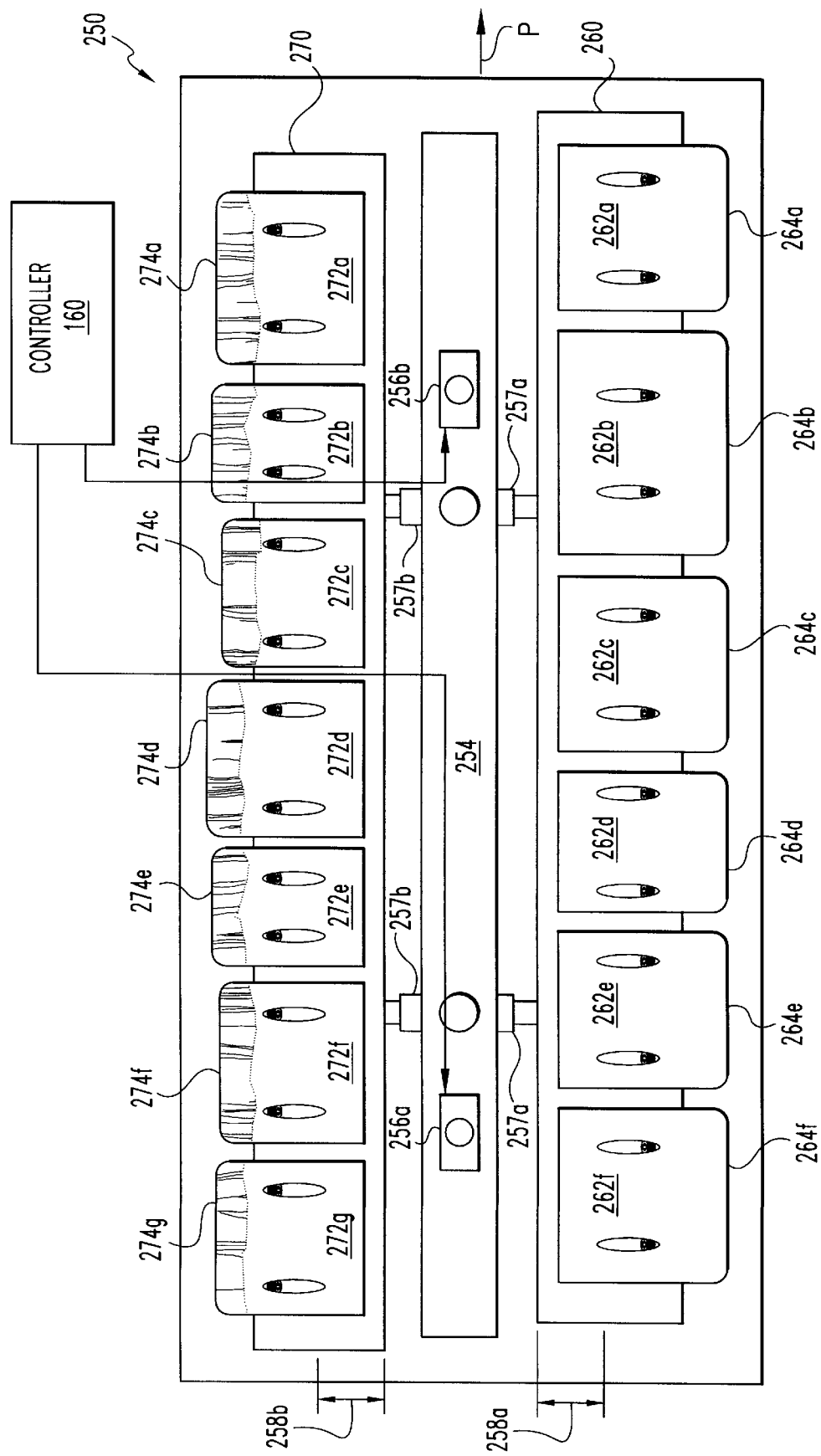

Referring to FIGS. 10–12, lower molding assembly 250 is further described. Assembly 250 has base 252 coupled to central carriage 254 by pneumatic cylinders 255. Preferably, four cylinders 255 are utilized each being positioned in a corner of carriage 254. Cylinders 255 are configured to reciprocally position carriage 254 along generally vertical travel distance 255a. Travel distance 255a generally varies along axis M. Frame 254 carries sensors 256a, 256b. Sensor 256a is configured to detect the presence of region 105 between assemblies 210, 250 and provide a corresponding presence detected signal to controller 160. Controller 160 may respond to this signal by directing execution of the molding cycle, halting conveyor 114, or directing other action as would occur to one skilled in the art. Sensor 256b is configured to detect temperature of region 105 and provide a corresponding temperature signal to controller 160. In response, controller 160 may adjust processing speed, the temperature output of heating station 117, or direct other action as would occur to one skilled in the art. Cylinder 255 is coupled to pneumatic system 205 which is controlled by controller 160.

Assembly 250 includes plate 260 which is movably coupled to central frame 254 by two pneumatic cylinders 257a. Cylinders 257a are configured to position plate 260 along generally horizontal travel distance 258a. Assembly 250 also includes plate 270 which is movably coupled to central frame 254 by two pneumatic cylinders 257b. Cylinders 257b are configured to position plate 270 along generally horizontal travel distance 258b. Cylinders 257a, 257b are controllably coupled to controller 160 via pneumatic subsystem 205.

Plate 260 includes a number of molding plugs 262a–262f each corresponding to one of shingles 62 of course 60 for panel 20. Plugs 262a–262f each have a corresponding end portion 264a–264f which correspond to end portions 64 of course 60. Plate 270 includes a number of molding plugs 272a–272g each corresponding to one of shingles 72 of course 70 for panel 20. Plugs 272a–272g each have a corresponding end portion 274a–274g which correspond to end portions 74 of course 70.

Referring generally to FIGS. 8a and 9–12, the operation of station 200 is discussed. Successive ductile regions 105 are periodically advanced from heating station 117 to molding station 200. Initially, ductile region 105 is positioned between upper molding assembly 210 and lower molding assembly 250 when in a fully retracted position. For this fully retracted stage, assembly 210 is at an uppermost position along axis M and assembly 250 is at a lowermost position along axis M as shown in FIG. 8a. At the same time, members 220a, 220b are each laterally positioned at an outermost extreme along travel distances 236a, 236b, respectively, as illustrated in FIG. 12. Also, plates 260, 270 are each laterally positioned at the innermost position along respective travel distances 258a, 258b.

Once region 105 is in position, controller 160 lowers assembly 210 by activating an actuator (not shown) and simultaneously raises carriage 254 by activating cylinders 255. As assemblies 210, 250 move toward each other, sensor 256a detects region 105 and sends a corresponding presence signal to controller 160. Also, the temperature of region 105 is determined with sensor 256b and reported to controller 160 for appropriate action. Eventually, region 105 is drawn against platen 212 by suction through apertures defined by platen 212 and blocks 214a, 214b, 216a, 216b; and assemblies 210, 250 meet in a fully extended configuration. For this fully extended stage of the molding cycle, assembly 210 is at a lowermost extreme of travel along axis M and carriage 254 reaches the uppermost extreme of travel along travel distance 255a.

Referring specifically to FIG. 11, members 220a, 220b travel to the innermost extreme along distances 236a, 236b, respectively via signals from controller 160 which activate corresponding cylinders 242a, 242b. As a result, molding recess 244a is formed by member 220a and molding recess 244b is formed by member 220b. To facilitate uniform formation of undercuts in region 105 corresponding to end portions 64 and 74 of panel 20, lower assembly 250 is utilized.

Controller 160 sends a first plug extension signal to cylinders 257a via subsystem 205 to extend plugs 262a–262f into recess 244a. Correspondingly, hollow, undercut end portions 64 are formed in cooperation with molding platen 212 and member 220a. While plugs 262a–262c remain extended, controller 160 sends a second plug extension signal to cylinders 257b via subsystem 205 to extend plugs 272a–272g into recess 244b. Correspondingly, hollow, undercut end portions 74 are formed in cooperation with molding platen 212 and member 220b. FIG. 11 depicts both sets of plugs 262a–262f and 272a–272g in the extended position. The cooling action of blocks 226a, 226b and plate 230 remove heat from region 105 promoting a rigid state in the shape defined by the surfaces of assemblies 210, 260 contacting region 105.

During the extension of plugs 272a–272g, controller 160 sends a first plug retraction signal to cylinders 257a to retract plugs 262a–262f. Subsequently, controller 160 sends a second plug retraction signal to cylinders 257b to retract plugs 272a–272g. Next, controller 160 directs the retraction of carriage 254, by sending appropriate retraction signals to cylinders 255 via system 205. Also, controller 160 directs retraction of members 220a, 220b by sending appropriate retraction signals to cylinders 242a, 242b. In response, members 220a, 220b return to the outermost lateral position and platen 212 is raised along axis M to release region 105 as molded portion 106. To initiate the next molding cycle, controller 160 sends an advancement signal to conveyor 114 to move the next region 105 into place for molding.

Controller 160 is preferably programmed to optimize the contact time during molding and adjust for temperature variations. In alternative embodiments, it is contemplated that various operations, stages, procedures, and processes described in connection with the present invention could be altered, rearranged, substituted, deleted, duplicated, combined, or added to other processes as would occur to those skilled in the art without departing from the spirit of the present invention. In one alternative embodiment, undercuts are formed in two or more successive molding stations. In other embodiments, the number and arrangement of various equipment actuators may be modified. Such modification may include the utilization of a hydraulic, electromagnetic, or other type of actuator as would occur to one skilled in the art either in combination with or in lieu of a pneumatic cylinder.

All publications, patents, and patent applications cited in this specification are herein incorporated by reference as if each individual publication, patent, or patent application were specifically and individually indicated to be incorporated by reference.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of manufacturing a number of panels, comprising:
   successively positioning each of a number of regions of a web of polymeric resin between a mold and a plug;
   molding each of the regions while in a ductile state to form a corresponding one of the number of panels, the panels each being shaped to define a number of simulated shingles;
   forming an undercut portion in each of the regions during said molding to correspondingly define an end portion of at least one of the simulated shingles for each of the panels, said forming including moving the plug relative to the mold; and
   cutting the sheet after said molding and said forming to separate the panels from the web.

2. The method of claim 1, wherein said positioning includes unwinding a predetermined length of the web from a reel for each of the regions.

3. The method of claim 1, further comprising heating each of the regions to bring about the ductile state.

4. The method of claim 1, wherein the panels are each molded with tongue and groove elements to facilitate mating of the panels to each other to form a roof covering.

5. The method of claim 1, further comprising circulating a cooling fluid through the mold.

6. The method of claim 1, wherein the plug belongs to a plurality of plugs, the plugs each correspond to one of the simulated shingles, and said forming includes reciprocally moving each of the plugs to form a corresponding hollow end portion of each of the simulated shingles.

7. The method of claim 6, wherein the simulated shingles are arranged in at least two courses.

8. The method of claim 7, wherein the plugs are arranged in two groups, one of the groups corresponding to one of the at least two courses of simulated shingles and another of the groups corresponding to another of the at least two courses of simulated shingles.

9. A method of manufacturing a panel, comprising:
positioning a sheet of polymeric resin between a first molding member and a second molding member;
contacting the sheet while in a ductile state with a molding surface to impart a shape simulating a number of roof shingles;
moving the first molding member relative to the molding surface to define a recess;
inserting the second molding member into the recess to form an undercut in the sheet; and
releasing the sheet from the first and second members to provide the roofing panel.

10. The method of claim 9, further comprising:
conveying the sheet a predetermined length after said releasing;
cutting the sheet to separate the panel from a remainder of the sheet after said conveying; and
repetitively forming a plurality of roofing panels from the sheet.

11. The method of claim 9, wherein said moving includes reciprocally moving the second member along a first axis and a second axis, the second axis being generally perpendicular to the first axis.

12. The method of claim 9, wherein the second molding member belongs to a plurality of molding members each configured to mold a different undercut portion of the shape.

13. The method of claim 9, further comprising heating each of the regions to bring about the ductile state.

14. The method of claim 9, wherein said contacting includes changing position of the molding surface along a first axis and the first member reciprocally moves along a second axis generally perpendicular to the first axis during said moving.

15. The method of claim 9, further comprising moving a cooling fluid through the first molding member.

16. The method of claim 9, wherein the first member includes a region defining a wood grain pattern of a shake shingle and the molding surface defines a corresponding wood grain pattern.

17. The method of claim 9, wherein the first molding member belongs to a pair of first molding members each configured to reciprocally move along a first axis relative to the molding surface during said moving, the second molding member belongs to a plurality of second molding members configured to move along the first axis relative to the molding surface during said inserting, and further comprising:

reciprocally moving the plurality of second molding members along a second axis generally perpendicular to the first axis; and
reciprocally moving the molding surface along the second axis.

18. A system for making a plurality of panels each shaped to define a number of simulated shingles, comprising:
first conveyor configured to move a web of polymeric resin along a processing path, said conveyor being adapted to periodically advance a predetermined length of the web to define a corresponding number of regions of the web;
a heating station positioned along the path to successively heat each of the regions to induce a ductile state; and
a molding station positioned along the path downstream from said heating station, said molding station including a moveable molding member, a molding plug, and a mold platen having a pattern corresponding to the simulated shingles, said platen being configured to successively contact each of the regions while in the ductile state to correspondingly mold each of the panels, said molding member being configured to move relative to said mold platen to define a recess and said plug being configured for insertion into said recess during contact of each of the regions with said platen to form an undercut defining an end portion of at least one of the simulated shingles.

19. The system of claim 18, further comprising a cutting station positioned along said path downstream from said molding station, said cutting station being configured to separate each of the panels from the web.

20. The system of claim 19, further comprising a second conveyor to transport each of the panels from said cutting station.

21. The system of claim 20, further comprising a controller operatively coupled to said first conveyor, said heating station, said molding station, said cutting station, and said second conveyor to regulate operation thereof.

22. The system of claim 20, further comprising:
a painting station positioned along said path downstream from said cutting station, said painting station being configured to successively paint each of the panels;
a third conveyor configured to successively receive the panels from the painting station;
a packaging station positioned downstream from said third conveyor; and
wherein operation of said third conveyor is timed to permit paint applied to each of the panels at said painting station to dry during transport of the panels from said painting station to said packaging station.

23. The system of claim 18, wherein said plug belongs to a number of plugs, said plugs each correspond to one of the simulated shingles to form a corresponding hollow end portion of each the simulated shingles.

24. The system of claim 18, wherein said pattern corresponds to an arrangement of the simulated shingles in at least two courses for each of the panels.

25. The system of claim 18, wherein at least one of said platen and said plug are configured to reciprocally move along a first axis and said plug is further configured to reciprocally move along a second axis substantially non-parallel to said first axis to form the undercut.

26. A system for making a plurality of panels, the panels each being shaped to define a number of simulated shingles, comprising:
a conveyor configured to move a web of polymeric resin along a processing path, said conveyor being adapted to periodically advance a predetermined length of the web to define a corresponding number of moldable regions;

a heating station positioned along the path to successively heat each of the regions to correspondingly induce a ductile state;

a molding station positioned along the path to receive each of the regions from said heating station while in the ductile state, said station including a first actuatable molding member, a first actuatable molding plug, and an actuatable mold having a pattern corresponding to the simulated shingles and being configured to successively contact each of the regions;

a controller operatively coupled to said conveyor and said molding station, said controller being configured to generate a first signal to move the mold into contact with one of the regions, a second signal to move said first actuatable molding member, and a third signal to actuate movement of said plug; and wherein said mold responds to said first signal to contact one of the regions, said first member responds to said second signal to move relative to said mold to define a first recess, and said first plug responds to said third signal to engage the recess to form an undercut in the one of the regions.

27. The system of claim 26, wherein said molding station includes a second actuatable molding member responsive to said second signal to move relative to said mold to define a second recess.

28. The system of claim 27, wherein said molding station includes a second actuatable plug configured to engage said second recess in response to a fourth signal generated by said controller.

29. The system of claim 28, wherein said first and second members each define a cooling passage configured to receive cooling fluid therethrough.

30. The system of claim 26, wherein said mold travels along a first axis in response to said first signal, said first molding member travels along a second axis different from said first axis in response to said second signal, and said first plug travels along said first and second axes in response to said third signal.

* * * * *